(12) United States Patent
Blommaert et al.

(10) Patent No.: US 8,756,624 B2
(45) Date of Patent: Jun. 17, 2014

(54) METHOD FOR SINGLE SIGN-ON WHEN USING A SET-TOP BOX

(75) Inventors: Marc Blommaert, Temse (BE); Qi Guan, Vienna (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 521 days.

(21) Appl. No.: 12/440,539

(22) PCT Filed: Sep. 6, 2007

(86) PCT No.: PCT/EP2007/059353
§ 371 (c)(1),
(2), (4) Date: Sep. 14, 2009

(87) PCT Pub. No.: WO2008/037581
PCT Pub. Date: Apr. 3, 2008

(65) Prior Publication Data
US 2010/0023962 A1 Jan. 28, 2010

(30) Foreign Application Priority Data
Sep. 26, 2006 (DE) .......................... 10 2006 045 352

(51) Int. Cl.
*H04N 7/16* (2011.01)
*H04N 7/167* (2011.01)
*H04L 9/00* (2006.01)
*H04N 7/18* (2006.01)

(52) U.S. Cl.
USPC ........ 725/25; 725/1; 725/27; 725/28; 725/31; 380/201; 380/259

(58) Field of Classification Search
USPC .................................................... 725/25–31
IPC .................. H04N 7/16,7/18, 7/20, 7/162, 7/173
See application file for complete search history.

(56) References Cited

U.S. PATENT DOCUMENTS

| 7,502,841 | B2 * | 3/2009 | Small et al. ................... 709/223 |
| 7,624,417 | B2 * | 11/2009 | Dua ............................... 725/114 |
| 7,653,932 | B2 * | 1/2010 | Arnold et al. ..................... 726/3 |
| 7,693,112 | B2 * | 4/2010 | Chang et al. .................. 370/335 |

(Continued)

FOREIGN PATENT DOCUMENTS

WO WO2006/078560 7/2006

OTHER PUBLICATIONS

Liberty Alliance Project, "Liberty ID-FF Bindings and Profiles Specification; Version 1.2-errata-v2.0", Jan. 1, 2004, 70 pages.
Malville, "A Survey on Identity Federation Solutions", Mar. 1, 2006, 20 pages, Annals of Telecommunications, V61, No. 3-4, France.

(Continued)

*Primary Examiner* — Nasser Goodarzi
*Assistant Examiner* — Fred Peng
(74) *Attorney, Agent, or Firm* — Michael Haynes PLC; Michael N. Haynes

(57) ABSTRACT

When the set-top box (STB) has been switched on, registration and authentication with the provider (IDP) are carried out (1, 2, 3). Following successful authentication, a piece of authentication information is then sent (4) to the set-top box (STB), which the set-top box (STB) sends (5) to a service provider (SP1) for registration. The service provider (SP1) then sets up (6) a connection to the provider (IDP) of the registration and authentication function in order to verify the authentication information and to request guidelines for charging, and the provider (IDP) of the registration and authentication function sends (7) confirmation to the service provider.

14 Claims, 2 Drawing Sheets

(56) References Cited

U.S. PATENT DOCUMENTS

| | | |
|---|---|---|
| 2002/0106081 A1 | 8/2002 | Yang |
| 2003/0051251 A1* | 3/2003 | Sugimoto et al. ............... 725/95 |
| 2003/0149781 A1 | 8/2003 | Yared |
| 2003/0219034 A1 | 11/2003 | Lotter |
| 2005/0049886 A1 | 3/2005 | Grannan et al. |
| 2007/0190977 A1* | 8/2007 | Fok et al. ...................... 455/411 |
| 2010/0023962 A1* | 1/2010 | Blommaert et al. ............ 725/31 |
| 2010/0138856 A1* | 6/2010 | Anglin, Jr. ..................... 725/30 |
| 2010/0269146 A1* | 10/2010 | Britt .............................. 725/110 |

OTHER PUBLICATIONS

Oasis, "Security Assertion Markup Language (SAML) V2.0 Technical Overview", Sep. 12, 2005, 51 pages, OASIS Open 2005.

ITU-T, "Series X: Data Networks, Open System Communications and Security; Directory; Information technology—Open Systems Interconnection—The Directory: Public-key and attribute certificate frameworks", Aug. 1, 2005, 174 pages, International Telecommunication Union; Telecommunication Standardization Sector of ITU.

Madsen, "Federated Identity Management for Protecting Users from ID Theft", Nov. 11, 2005, 7 pages, DIM'05; ACM.

\* cited by examiner

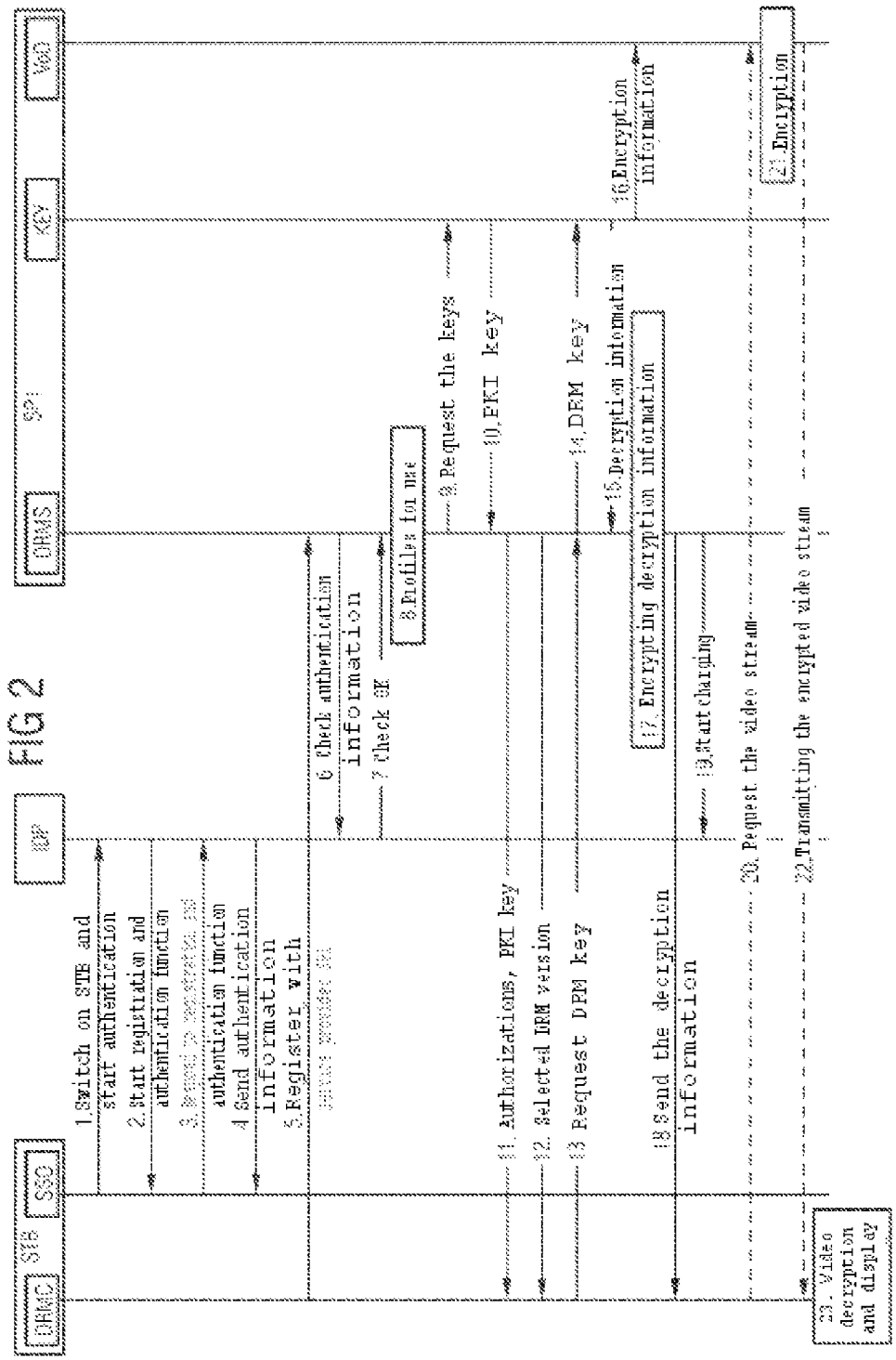

METHOD FOR SINGLE SIGN-ON WHEN USING A SET-TOP BOX

TECHNICAL FIELD

The invention relates to a method for single-sign-on when using several applications, wherein a set-top box is used for the utilization of the applications and the applications are provided by various service providers.

PRIOR ART

Nowadays, users of a communication network normally frequently have to go through a registration and authentication function which can also be called log-in in order to be able to access, for example, an application of a service provider, a computer, a communication network or a system etc. In this context, a log-in is a process for registering a user, e.g. in the case of an application, on a computer, a system or in a communication network etc., in which the user normally inputs a user identification for identification and, e.g., a password or a personal identification number, a PIN etc. The application, the communication network or the system etc. then carries out a check of access authorizations—a so-called authentication.

In this context, the identification designates a process by means of which, e.g., a user, an application or a system is unambiguously allocated to its role defined in the application, in the communication network or in the system. In accordance with this role and in most cases after completed authentication, so-called authorizations for the use of applications, of the system, of the communication network etc. are then granted, for example, by a service provider etc. In this context, the term authentication combines all processes by means of which the authenticity and the origin are established and checked during a transmission of information (e.g. by means of passwords, PIN etc.).

So that a user can use the registration and authentication function at all for accessing, e.g. an application, a system, a communication network etc., the user or the system or terminal via which the application, the system, the communication network etc. are to be used must carry out a so-called registration. Registration is generally understood to be a process in which information about, e.g., the user and/or the terminal (e.g. name, user identification, password, data for any charging etc.) is entered, for example, in a directory, a database or a register at the service provider or system operator. After a successful registration which is usually carried out once before the very first use of an application, a system etc., the user is then provided with the log-in for registration and authentication.

For a simpler access to applications, systems etc. provided with log-in, a possibility of a registration and authentication by so-called single-sign-on exists today.

The term single-sign-on stands for single registration and means that a user can access, for example, all applications, computers, systems etc. for which this user is authorized, after going through the log-in process only once. Using, e.g. a further application or another computer or system no longer then requires a new log-in (registration and authentication) of the user.

In the case of single-sign-on, a user is identified and authenticated only once with the aid of the log-in process, for example in a communication network, a system or a so-called portal, which usually provides several applications in the World Wide Web. After that, the task of identification and authentication is handled by a single-sign-on mechanism.

Normal approaches to a solution for single-sign-on mechanisms are, for example:

So-called portal solutions which are offered, e.g., in the World Wide Web for using several applications. In this arrangement, the user can log into a so-called portal for the first time and is authenticated there and authorized for the use of applications.

So-called ticketing systems in which several applications have a common item of authentication information for a user. This information is then exchanged, for example, between the applications or transferred to the logged-in user in the form of a virtual ticket.

Or local solutions in which, e.g., the user installs locally at his workstation or computer a (client) software which automatically enters only the user identification or user identification and password, e.g. in a log-in mask which appears. These data can be stored, for example, in an encrypted file locally at the workstation, the computer or the terminal of the user, on a so-called chip card or on a so-called single-sign-on server.

In the field of entertainment electronics a set-top box is a device which is connected to another terminal—in most cases a television set or a screen, in order to provide a user with additional possibilities of using the terminal. The most important capabilities provided by a set-top box are, for example, replaying media (e.g. VHS, DVD etc.), which can be interactive, e.g. during the playing, recording received data and receiving programs via alternative transmission paths (e.g. satellite, broadband cable or Internet) and alternative transmission methods (digital, encrypted etc.). Using the set-top box, therefore, functions such as, for example, decompression, decoding, digital/analog conversions, return channel management etc. are also performed for interactive and digital video and/or TV systems. A set-top box can also provide for access to the Internet with the television set as terminal.

In the field of home entertainment, especially, service providers offer numerous applications such as, e.g., video-on-demand, interactive games etc. which can be used by means of a set-top box. Video-on-demand, e.g., is an application in which users are enabled to call up and play a film from a selection of video films at any time, in most cases for a charge. In this arrangement, the film is sent to the set-top box, e.g. via a broadband network or the Internet. The provider needs at least a so-called streaming server for this purpose.

Furthermore, manufacturers of set-top boxes can offer so-called software upgrades for, e.g. the set-top box, as application. The software upgrade can be loaded by the user via, e.g., a broadband network, via satellite or the Internet, into the set-top box and the new software can then be installed.

To protect copyrights and marketing rights on intellectual property in digital form (e.g. film and sound recordings, software etc.), so-called digital rights management systems (DRM) are additionally used by service providers. In principle, these systems provide for new accounting methods for licenses and rights and control mechanisms about the use of the digital data. So that applications protected by digital rights management systems can be used, a special software—a so-called DRM client—is normally needed on the terminal of the user (e.g. set-top box).

If a service provider provides applications which can be used via a set-top box (e.g. pay TV, video-on-demand etc.) for a charge, so-called conditional access systems are also used in order to ensure that the applications are used by authorized (paying) users. Conditional access systems can also be used in combination with DRM systems.

To receive data or programs, use applications such as, e.g., video-on-demand etc. via the set-top box, an access to a communication network via a special provider (e.g. a broadband cable operator or an Internet service provider) is normally used. Between this special provider and the user of the set-top box, a business relation normally exists—e.g. by subscription. The special provider then carries out, e.g., agreed charging of the user. The user or the set-top box, respectively, is then registered with this provider and the applications and transmission paths offered by this provider can then be used, for example, after going through a registration and authentication function.

If a user wishes to use set-top box applications by different service providers, he must currently go through a registration and authentication function for the access to the communication network or to the transmission paths, respectively, and then carry out a separate registration and authentication for each of the applications at the respective service provider. These registrations and authentications can be arranged very differently depending on service provider, but also in dependence on, e.g., DRM and/or conditional access systems used.

With each of these registrations and authentications, the user then has to input, for example, registration and authentication information such as, e.g., user identification, password, PIN, configuration data of the set-top box etc.

It is not only disadvantageous, therefore, that a separate registration and authentication has to be carried out for each of these applications at the respective service provider, but also that information such as, e.g., user data, user identification, password etc. has to be input several times during this process. In addition, there is the disadvantage, for example, that user data (e.g. name, address etc.) must be made known to a service provider even though it is not intended to set up a long-term relation with this service provider because, e.g., the application or the content is used only once.

In this case, e.g., single-sign-on is used for applications such as, e.g., so-called web applications in the case of portal solutions. In the case of applications which can be used via a set-top box, the use of single-sign-on for a single registration and authentication is currently not known.

DESCRIPTION OF THE INVENTION

The present invention is therefore based on the object of specifying a method by means of which a user is enabled to obtain access to applications by different providers which can be used with a set-top box by means of single-sign-on and in which only data necessary for the respective application are forwarded.

According to the invention, this object is achieved by a method of the type initially specified, wherein a provider provides a registration and authentication function, an agreement has been made between the provider of the registration and authentication function and service providers and a set-top box is registered with the provider of the registration and authentication function. After the set-top box has been switched on, the registration and authentication function is then called up and a registration and authentication is carried out. After a successful authentication of the set-top box, the provider sends an item of authentication information to the set-top box which is then used for a registration with a service provider by transmission by the set-top box. The service provider then sets up a connection to the provider of the registration and authentication function in order to verify the authentication information and to request guidelines for charging. Then the provider of the registration and authentication function sends a confirmation to the service provider.

The main aspect of the solution proposed according to the invention consists, on the one hand, in that a user who wishes to obtain access to applications of different service providers via a set-top box goes through a registration and authentication function only once. Registration and authentication information (e.g. password, PIN etc.) is now input only once via a set-top box—e.g. after the set-top box has been switched on, a registration with the provider of the registration and authentication function (e.g. broadband cable operator, Internet service provider etc.) is carried out. After that, the task of registration with a service provider is handled by a single-sign-on mechanism.

On the other hand, the method according to the invention provides the advantage that, for example, user data (e.g. name, address etc.) now only need to be made known to the provider of the registration and authentication function with which a relatively long-term business relation exists and which also handles, e.g., the charging. Only data necessary for the applications used are now advantageously transmitted to the service providers (e.g. configuration data of the set-top box etc.). As a result, e.g., user and configuration data can be separated and the user remains largely anonymous for the service provider.

It is advantageous if, during the registration with a service provider, the set-top box sends a configuration profile of the set-top box to the service provider in addition to the authentication information, since the service provider is informed in this simple manner, for example, about the hardware and/or software used for the set-top box. The user can then be provided, e.g., with the version of the application suitable for the set-top box. Thus, it is important, e.g. for DRM systems, to obtain information about the DRM client software used by the set-top box so that the application (e.g. video-on-demand etc.) can be used without problems.

To achieve the object, it is also provided that the confirmation of the provider of the registration and authentication function additionally comprises authorizations of the user of the set-top box. By this means, an authorization profile set up for the user with the provider of the registration and authentication function, which profile results, e.g., from the registration or subscription, respectively, can be forwarded in a simple manner to a service provider.

In a preferred development of the method according to the invention, it is recommended that conditions for a digital rights management are negotiated between the set-top box and the service provider, that firstly an item of encryption information is generated for the digital rights management DRM, which item is transmitted jointly with adjustment conditions by the service provider to the set-top box, and that thereafter an item of encryption information is generated for the use of the application, which is then sent encrypted to the set-top box. Digital rights management (DRM) or DRM systems are used for protecting copyrights and marketing rights to intellectual property in digital form (e.g. film and sound recordings, software etc.). In principle, these systems provide for new accounting methods for licenses and rights and control mechanisms about the use of the digital data. Using applications protected by DRM systems requires so-called DRM clients which must be installed, e.g., on the set-top box. Since several DRM clients can be available on a set-top box, it is advantageous to negotiate conditions for the DRM such as, e.g., necessary DRM client, version of the DRM client etc. To protect against unlawful use (e.g. without license, unauthorized copying etc.) of an application or of the content provided by the application, it is advantageous to encrypt the information about the DRM and the application or the content itself.

It is advantageous if the so-called Liberty Alliance Protocols LAP are used for the registration and authentication function since the LAPs have been defined as open standard by the so-called Liberty Alliance for distributed architecture structures with several service providers (e.g. Internet etc.) which demand and administer different user data, for example due to different security specifications. The Liberty Alliance is an economic initiative (consisting of 150 companies, non-profit organizations and authorities from the mobile commerce and security industry), with the aim of developing cross-industry platforms and standards (particularly in the field of mobile applications) for the world wide security of transactions on the Internet, and clarifying technical/organizational questions with regard to registration, certification and interoperability. In this context, the Liberty Alliance describes specifications as a basis for managing identities (e.g. user data etc.) in the environment of networked structures and communication protocols for their application, for example in web services.

It is advantageous if a so-called public-key infrastructure PKI is used for the encryption information for the digital rights management. In cryptography, PKI is a so-called asymmetric cryptographic system which makes it possible to issue, to distribute and to check digital certificates or keys. The certificates or keys used within a PKI are specified, for example, for users or terminals. The PKI has the advantage, therefore, that by means of the digital certificate, an authentication can be carried out directly by the respective application or the respective service provider. Apart from authentication PKI can also be used for encrypting data.

It is suitable if a symmetric encryption system is used for encrypting an application used by the set-top box. In a symmetric encryption system, the same key is used for encryption and decryption in contrast to PKI. In this arrangement, the key must first be exchanged in a secure manner between application or a service provider and set-top box. However, a symmetric encryption system has the advantage that the algorithms for encryption and decryption run very quickly and can also be implemented, e.g., directly in the form of hardware chips.

An advantageous embodiment of the invention provides that the so-called Verimatrix Content Authority System VCAS is used for the digital rights management. VCAS is a software-based system which has been developed especially for protecting digital video and audio data which are used, e.g., in applications such as video-on-demand via a set-top box. VCAS thus represents a so-called content protection and DRM system and is used especially in the field of the Internet and in the case of digital video broadcasting (DVB) via e.g. broadband cable, satellite etc. VCAS is based on the principles of PKI, using the ITU-T X.509 standard for a definition of digital certificates. The X.509 standard by the ITU-T currently represents one of the most important standards for PKI and digital certificates.

BRIEF DESCRIPTION OF THE DRAWINGS

In the text which follows, the invention will be explained in greater detail with reference to FIGS. 1 and 2 which show in exemplary manner components involved in carrying out the method according to the invention and the diagrammatic sequence of the method according to the invention for single-sign-on when using several applications by different service providers.

EMBODIMENT OF THE INVENTION

Figure 1:
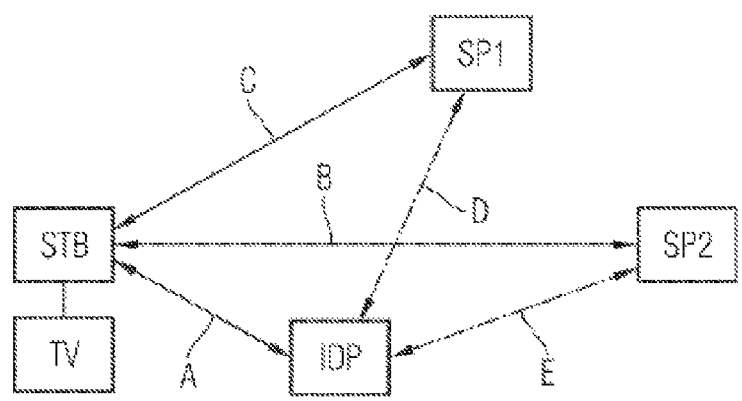

FIG. 1 shows in exemplary manner components which are involved in carrying out the method for single-sign-on when using a set-top box STB via which applications by different service providers SP1, SP2 are used.

FIG. 1 shows a set-top box STB which is connected, for example, with a television set TV as display unit. Via the television set TV, contents such as video and audio data can be used, for example, which are provided by applications such as, e.g., video-on-demand.

The set-top box STB communicates with a provider IDP of a registration and authentication function via an exemplary connection A (e.g. broadband cable, Internet etc.). Between the provider IDP, which can be, e.g., an Internet service provider or broadband cable operator, and the user of the set-top box STB a relatively long-term business relation usually exists.

The set-top box STB is therefore registered with the provider IDP of the registration and authentication function. The provider IDP of the registration and authentication function offers, on the one hand, access to a communication network (e.g. broadband cable network, Internet etc.) and possibly also applications, and on the other hand the provider IDP of the registration and authentication function also carries out the charging of the user of the set-top box STB—e.g. by means of a so-called post billing function.

FIG. 1 also shows two exemplary service providers SP1, SP2 with which the set-top box can set up a contact for the use of offered applications via the exemplary connections B or C of a communication network (e.g. broadband cable, Internet etc.). The service providers SP1, SP2 have also made an agreement with the provider IDP of the registration and authentication function, as a result of which a so-called trusted relationship exists between these which is symbolized by lines D and E in FIG. 1.

Service providers SP1, SP2 can be, for example, providers of video-on-demand, audio-on-demand or the manufacturer of the set-top box STB who offers a so-called software upgrade for the set-top box in this manner.

FIG. 2 shows in exemplary manner the diagrammatic sequence of the method according to the invention for single-sign-on when using several applications by different service providers SP1, SP2 when using a set-top box STB. In this context, the method according to the invention is explained with reference to an exemplary service provider SP1 which offers video-on-demand via a video-on-demand server VoD. The contents transmitted with video-on-demand are protected by a digital rights management system DRMS which is also operated by the service provider SP1. The contents of video-on-demand are also transmitted encrypted to the set-top box STB. Therefore, a database KEY for encryption information is also set up at the service provider SP1.

The set-top box STB has a single-sign-on function SSO in which, for example, information for an authentication, a user profile and a configuration profile (e.g. hardware and/or software version used etc.) of the set-top box STB can be stored. A so-called DRM client DRMC is installed in the set-top box STB for the use of applications protected by DRM systems DRMS.

The access to a communication network (e.g. broadband cable network, Internet etc.) is established via a provider IDP of a registration and authentication function with which the set-top box STB or the user of the set-top box STB is registered.

In a first method step 1, the set-top box STB is switched on and the authentication process is initiated by the set-top box. Thus, e.g., the set-top box can call up a device authentication at the provider IDP of the registration and authentication function. In this context, for example, a request for the device authentication is made from an Internet address for Liberty Alliance Protocols such as, e.g., https://auth.Idp.com. This Internet address represents a so-called bootstrap entry point for a device authentication. This procedure has the advantage that the user no longer needs to enter data in this case, but data stored by the set-top box e.g. during a registration are used. However, a prerequisite for this is a linkage with an IP-based communication network or the Internet for a transmission of data to the provider IDP of the registration and authentication function (e.g. broadband cable network or ADSL operator etc.), wherein this linkage may require separate registration and authentication. Thus, for example, the user, when switching on the set-top box STB, can be requested to authenticate himself for this linkage, e.g. by entering a user identification and a password.

In a second method step 2, the provider IDP of the registration and authentication function starts the registration and authentication function. In this context, e.g. a so-called hash function (e.g. SHA-1, SHA-2 or other widely used cryptographic hash functions) can be used for the registration and authentication, such as, e.g., for a transmission between the set-top box STB and the provider IDP of the registration and authentication function and a storage of passwords with the provider IDP of the registration and authentication function. As described in the first method step 1, a communication is to be carried out between the set-top box STB and the provider IDP of the registration and authentication function (as well as a communication between the set-top box STB and the service provider SP1) within a secure tunnel (e.g. https).

In a third method step 3, a response is sent by the single-sign-on function SSO of the set-top box STB—e.g. again by using the previously quoted hash function—to the provider IDP of the registration and authentication function. In a fourth method step 4, this response is processed and checked by the provider IDP of the registration and authentication function and, in the case of a successful authentication, an item of authentication information is sent to set-top box STB or to the single-sign-on function SSO of the set-top box, respectively.

Before an access to the video-on-demand application of the service provider SP1 is possible for the set-top box, the set-top box STB must be registered with the service provider— e.g. via the digital rights management system DRMS operated by the latter—in a fifth method step 5. For the registration, the set-top box STB or the single-sign-on function SSO, respectively, sends the authentication information together with the configuration profile (e.g. hardware, software, digital rights management clients DRMC and the respective version used etc. ) of the set-top box STB to the service provider SP1. In this context, the set-top box STB does not transmit, for example, any information from the user profile to the service provider SP1, as a result of which the set-top box STB remains anonymous to the service provider SP1. The configuration profile sent can also comprise, e.g., information (e.g. Internet link, Internet address etc.) for the provider IDP of the registration and authentication function.

In a sixth method step 6, the service provider SP1 sends the authentication information e.g. according to the information (e.g. Internet link, Internet address etc.) in the sent configuration profile of the set-top box STB to the provider IDP of the registration and authentication function for checking and establishing guidelines for charging etc. the user. In a seventh method step 7, the provider IDP of the registration and authentication function conveys a confirmation to the service provider SP1 if the check of the authentication information was positive. In addition to the confirmation, authorizations and information about the user of the set-top box STB can also be transmitted to the service provider SP1, which information can be used, e.g., for charging by the service provider SP1.

Of the following method steps 8 to 12, a negotiation of the digital rights management client DRMC and its version and a generation of the associated encryption information via the service provider SP1 is described. Both symmetric and asymmetric encryption systems can be used as encryption in the case of digital rights management. In conjunction with digital rights management, however, a so-called public-key infrastructure is used most frequently, which will also be represented by way of example in the text which follows.

In an eighth method step 8, a profile for the set-top box STB is then set up with the service provider SP1, e.g. at the digital rights management system DRMS. This profile can comprise, e.g., the confirmation of the provider IDP of the registration and authentication function and the authorizations and information and also the configuration profile of the set-top box STB, transmitted therewith. Using the configuration profile which also contains the digital rights management client or clients DRMC used by the set-top box STB and the respective version, the digital rights management system DRMS establishes which digital rights management client DRMC and which version are to be used for the use of the video-on-demand application. The decision about the digital rights management client DRMC also determines a corresponding encryption algorithm and associated keys—e.g. PKI key.

In a ninth method step 9, the digital rights management system DRMS then requests the corresponding keys, e.g. for a public-key infrastructure—from the database KEY for encryption information. In a tenth method step 10, the database KEY transmits the PKI keys to the digital rights management system DRMS, wherein the keys, e.g., can be either newly generated or read out of a memory. In an eleventh method step 11, the PKI keys and associated adjustment data (e.g. authorizations, selected adjustments etc.) are then sent to the set-top box STB, wherein the keys, which, however, have a limited validity time, can be stored in the set-top box STB. In a twelfth method step 12, the set-top box STB is then also informed about the selected digital rights management client DRMC and its version by the service provider SP1.

Of the following method steps 13 to 19, generating the encryption information for use of the application (e.g. video-on-demand) for the set-top box STB and sending this encryption information are described. For the encryption of the application a symmetric encryption system can be used, e.g., the encryption information to be transmitted being encrypted by means of PKI. However, it is also possible to use other encryption systems for the encryption.

In a thirteenth method step 13, the set-top box STB requests an item of encryption information for the digital rights management from the service provider SP1 or from the digital rights management system DRMS which is operated, for example, by the service provider SP1. In a fourteenth method step 14, this request is forwarded by the digital rights management system DRMS to the database KEY for information on encrypting the application and the database KEY provides both encryption and decryption information—e.g. by generating an encryption key and a decryption key or by also calling up these keys from a memory. In a fifteenth method step 15, the encryption information is then transmitted on the one hand, from the database KEY to the digital rights management system DRMS. On the other hand, in a sixteenth step 16, the database KEY provides the encryption information from the database KEY to the video-on-demand server VoD for the encryption of the application video-on-demand or of the content transmitted by this application, respectively.

In a seventeenth method step 17, the decryption information is encrypted by the digital rights management system DRMS—e.g. by means of a PKI system with a so-called public key for the digital rights management client DRMC of the set-top box STB. In an eighteenth method step 18, the encrypted decryption information is then transmitted to the set-top box STB or to the digital rights management client DRMC, respectively, for the use of the video-on-demand application. In a nineteenth method step 19, the service provider SP1 then forwards information on charging the user of the set-top box STB to the provider IDP of the registration and authentication function (e.g. broadband cable network or ADSL operator etc.), since the latter, in contrast to the service provider SP1, has a profile of the user (name, address etc.).

In method steps 20 to 22, the encryption and use of the application is then described.

In a twentieth method step 20, the set-top box sends a request for use of the application to the service provider SP1. In the case of video-on-demand, for example, a downloading of the video content from the video-on-demand server VoD of the service provider SP1 is requested. In a twenty first method step 21, the application is encrypted by the service provider; i.e., e.g. the video contents are treated with the encryption information by the video-on-demand server VoD of the service provider. In a twenty second method step 22, the encrypted video contents or the encrypted application, respectively, are then loaded into the set-top box STB and decrypted by the set-top box STB in a twenty third method step 23. The application can then be used by means of the set-top box STB which, in the case of video-on-demand, means that the video contents can be displayed, e.g., on a television set connected to the set-top box STB.

For the digital rights management, the service provider SP1 can use, for example, the so-called Verimatrix Content Authority System VCAS. In this context, VCAS is a software-based system which has been developed especially for the protection of digital video and audio data and is based on the principles of PKI. The VCAS system validates and issues so-called X.509 certificates for each component of a service provider SP1. These certificates are based on the X.509 standard of the ITU-T which specifies a definition of digital certificates and which currently represents one of the most important standards of digital certificates. If a VCAS system is used for digital rights management, the digital rights management client DRMC of the set-top box STB, for example, is first registered with the VCAS system and then a digital certificate is validated and issued to the set-top box STB together with encryption information (e.g. public keys, private key etc.). The certificate and the encryption information are then stored in the set-top box for authentication and decryption processes.

When a VCAS system is used, the use of an application such as, e.g., video-on-demand takes place as described in method steps 13 to 23, with the addition that the VCAS system checks with each communication with the set-top box STB the certificate sent along or a so-called signature of the set-top box STB, respectively.

What is claimed is:

1. A method comprising:
    via a predetermined provider machine communicatively coupled to a communications network, registering and authenticating a set-top box with each of a plurality of service providers according to an agreement between each of said plurality of service providers and said provider, said set-top box adapted to implement a plurality of applications provided by said plurality of service providers, said registering and authenticating comprising:
    receiving first authentication information from the set-top box;
    sending second authentication information to said set top box, wherein, responsive to receiving said second authentication information, said set top box is adapted to register itself with each of said plurality of service providers by transmitting said second authentication information to each of said plurality of service providers;
    receiving said second authentication information and a request for guidelines for charging via a connection set up by each of said plurality of service providers;
    verifying said second authentication information received via said connection from each of said plurality of service providers;
    sending guidelines for charging to each of said plurality of service providers; and
    sending a confirmation to each of said plurality of service providers.

2. The method of claim 1, wherein:
said set top box is adapted to transmit a configuration file to each of said plurality of service providers.

3. The method of claim 1, further comprising:
authorizing a user of said set-top box and transmitting authorizations of said user of said set top box to at least one of said plurality of service providers.

4. The method of claim 1, wherein:
said set top box is adapted to receive digital rights management encryption information from one of said plurality of service providers.

5. The method of claim 1, wherein:
each of said plurality of service providers is adapted to send digital rights management encryption information to said set-top box.

6. The method of claim 1, wherein:
said registration uses Liberty Alliance Protocols (LAP).

7. The method of claim 1, further comprising:
causing at least one of said plurality of service providers to send public-key infrastructure information for digital rights management to said set-top box.

8. The method of claim 1, wherein:
at least one of said plurality of applications is encrypted using symmetric encryption.

9. The method of claim 1, further comprising:
causing at least one of said plurality of service providers to send public-key infrastructure information for digital rights management to said set-top box, said public-key infrastructure information validated and issued by a Verimatrix Content Authority System.

10. The method of claim 1, wherein:
a public key infrastructure is used for sending encryption information.

11. The method of claim 1, further comprising:
causing at least one of said plurality of service providers to use public-key infrastructure for sending encryption information for a digital rights management to said set-top box.

12. A method comprising:
an authentication provider operatively adapted for:
    transmitting a second authorization information to a set-top box responsive to receiving from the set-top box a first authentication information;

transmitting a verification of the second authentication to a service provider responsive to receiving the second authorization information from the service provider; and receiving a user-billing message from a service provider;

wherein:

the verification of the second authorization comprises a guideline for charging a user of the set-top box by the service provider;

the user-billing message comprises an identification of the second authorization information;

the service provider is one of a plurality of service providers;

the authentication provider is a machine.

13. A method comprising:

a set-top box operatively adapted for:

decrypting an encrypted resource responsive to receiving an encrypted resource from a service provider;

requesting the encrypted resource responsive to receiving a Digital Rights Management key from the service provider;

requesting the Digital Rights Management key from the service provider responsive to an acknowledgement of registration from the service provider;

transmitting a registration message to the service provider responsive to receiving a second authorization information from an authentication provider; and transmitting a first authorization information to the authentication provider;

wherein:

the registration message comprises the second authorization information, a hardware-and-software configuration profile, and an identification of the authentication provider;

the acknowledgement of registration from the service provider comprises at least one key from a Public Key Infrastructure keypair; and the service provider is one of a plurality of service providers.

14. A method comprising:

a service provider operatively adapted for:

transmitting an encrypted resource to a set-top box responsive to receiving an encrypted resource request from the set-top box, transmitting a user-billing message to an authentication provider responsive to receiving the encrypted resource request from the set-top box, transmitting an encrypted Digital Rights Management key to the set-top box responsive to receiving a verification message from the authentication provider; and transmitting a verification request to the authentication provider responsive to receiving a registration message from the set-top box;

wherein:

the registration message comprises an anonymous authentication information, an identification of the authentication provider, and a hardware-and-software configuration profile;

the verification request comprises an identification of the anonymous authentication information;

the verification message comprises a guideline for charging a user of the set-top box the encrypted Digital Rights Management key is encrypted using a key from a Public Key Infrastructure keypair known to the set top box;

the user-billing message comprises an identification of the anonymous authorization information; and the service provider is a machine.

* * * * *